Oct. 22, 1946.  L. P. SHARPLES  2,409,713
SEPARATION OF LIQUIDS FROM SOLIDS
Filed Aug. 19, 1942  3 Sheets-Sheet 1

INVENTOR
Laurence P. Sharples.
BY Maurice A. Crews
ATTORNEY

Oct. 22, 1946.  L. P. SHARPLES  2,409,713
SEPARATION OF LIQUIDS FROM SOLIDS
Filed Aug. 19, 1942    3 Sheets-Sheet 2

INVENTOR
Laurence P. Sharples.
BY Maurice A. Crews
ATTORNEY

Oct. 22, 1946.    L. P. SHARPLES    2,409,713
SEPARATION OF LIQUIDS FROM SOLIDS
Filed Aug. 19, 1942    3 Sheets-Sheet 3
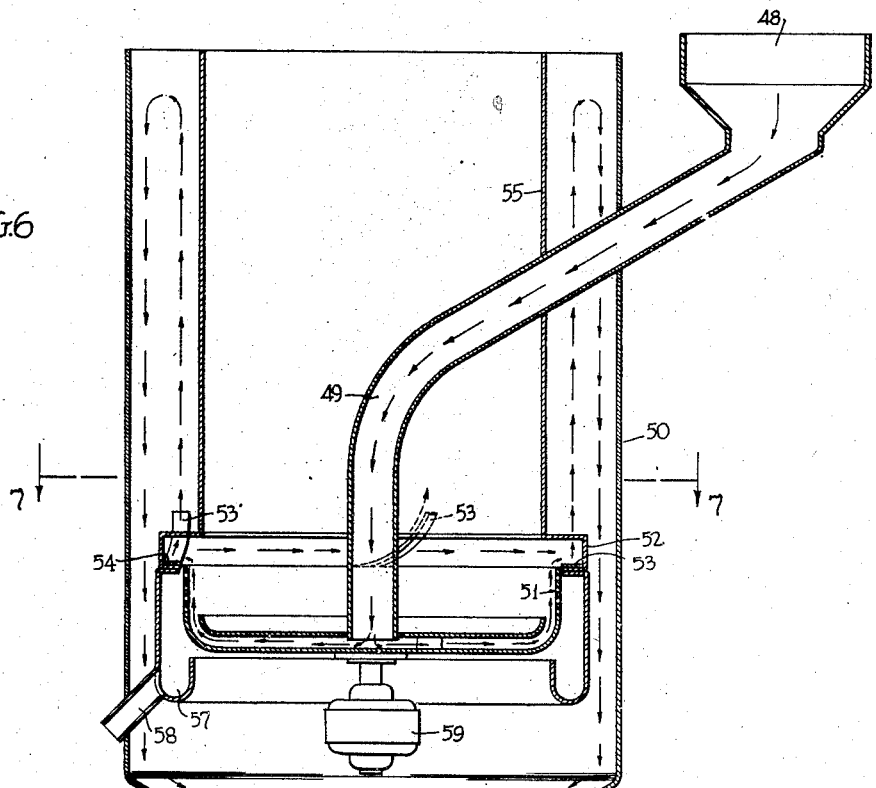
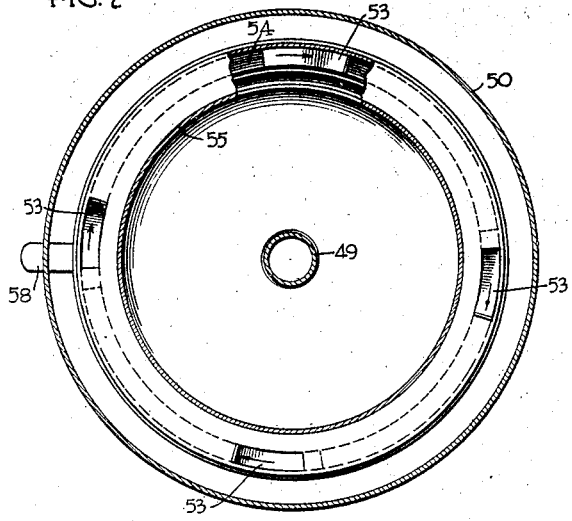
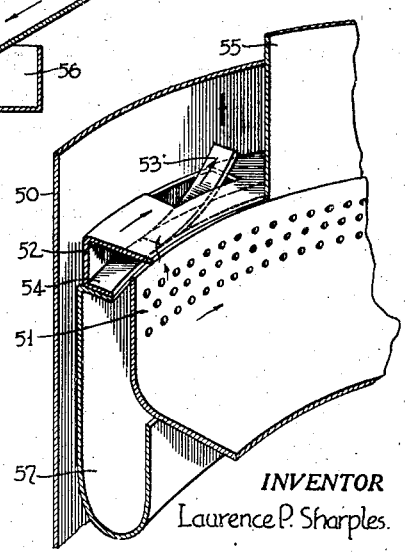
INVENTOR
Laurence P. Sharples.
BY Maurice A. Crews
ATTORNEY Patented Oct. 22, 1946

2,409,713

UNITED STATES PATENT OFFICE 2,409,713

SEPARATION OF LIQUIDS FROM SOLIDS

Laurence P. Sharples, Ardmore, Pa., assignor to The Sharples Corporation, Philadelphia, Pa., a corporation of Delaware Application August 19, 1942, Serial No. 455,288

5 Claims. (Cl. 210—68)

The present invention pertains to the dehydration of solids and provides a process and apparatus by which adhering liquid may be separated from solids by the combined operations of centrifugation and subsequent evaporation. In the practice of the invention, solids discharged at a plurality of successive points about the surface surrounding the zone of solids discharge of a centrifugal rotor are deflected and collected in the form of a confined stream or a plurality of such streams. This stream (or streams) is directed to a collecting receptacle under force derived from the momentum of discharge from the centrifugal rotor. In the preferred embodiment of the invention, the momentum of the solid particles due to the velocity of tangential discharge from the centrifugal rotor is further utilized by directing them upwardly to effect removal of liquid still adhering to said solids after centrifugation. By this combination of features, it is possible to prevent stickage of solids against surfaces contacted by these solids after discharge from the rotor and to obtain more effective drying of the solids by subjecting them to a prolonged flight through an evaporating chamber before they come to rest.

Figure 1:
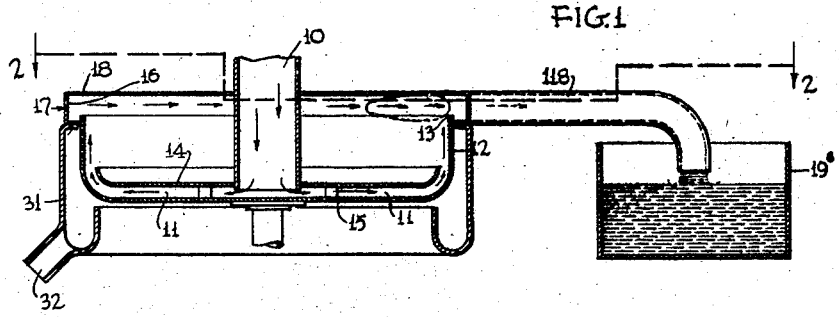
Figure 2:
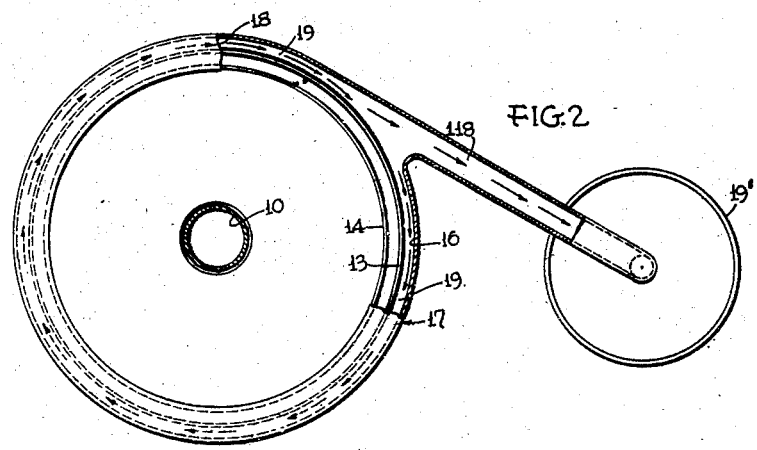
Figure 3:
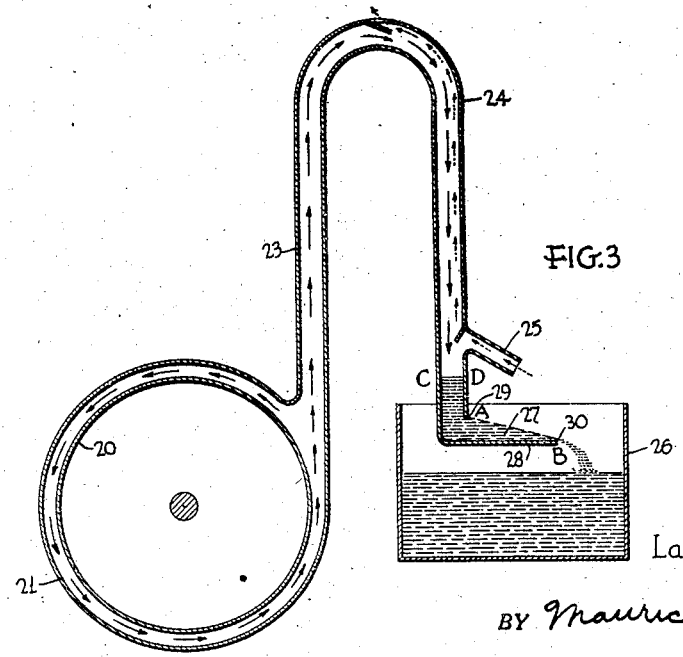
Figure 4:
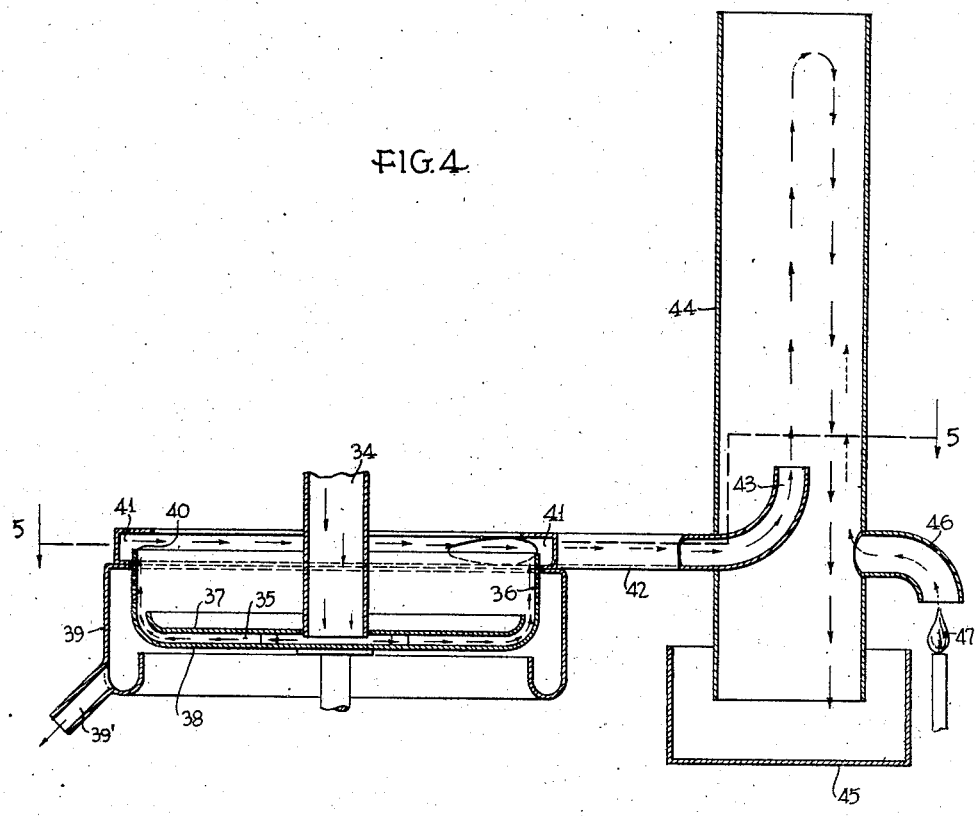
Figure 5:
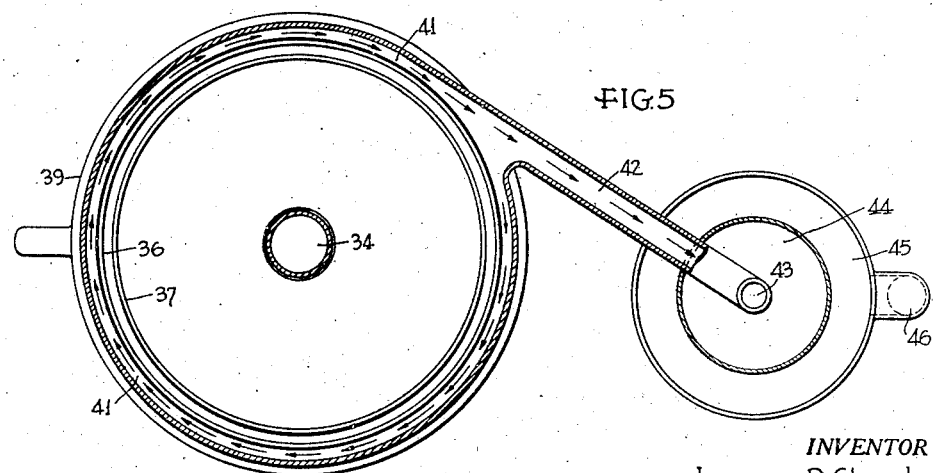

The detailed manner in which the invention is carried out will be evident from a reading of the following description in the light of the attached drawings, in which, Figure 1 is a diagrammatic side elevation, illustrating the principle of collecting the solids in the form of a confined stream and directing this stream to a collecting receptacle, Figure 2 is a diagrammatic plan view of the apparatus illustrated in Figure 1, Figure 3 is a diagrammatic cross section, illustrating the application of the principles of the invention to a centrifugal separator with a rotor mounted on a horizontal axis, Figure 4 is a cross section through a centrifugal separator and associated evaporating apparatus of the invention, Figure 5 is a cross section on the line 5—5 of Figure 4, Figure 6 is a view similar to Figure 4 illustrating an alternative embodiment, Figure 7 is a cross section on the line 7—7 of Figure 6, and Figure 8 is a detail cross section illustrating features of the solids receiving and deflecting features of Figures 6 and 7.

This invention may be considered as a development and improvement of those illustrated and described in my prior patents, 2,095,206, and Reissue 21,882. In each of these prior patents, solids discharged under centrifugal force from a centrifugal dehydrating rotor are deflected from their tangential course as discharged from the centrifugal rotor and pass from the zone of centrifugation without being permitted to impinge against any surface which is suddenly and violently impacted by said solids because of the sharp angle formed by that surface with respect to the course of the solids. In the preferred embodiments of the present invention, as in my prior patent, Reissue 21,882, the solids, after discharge from the centrifugal rotor, are caused to move into contact with a collecting ring which surrounds the surface from which said solids are discharged from said rotor in such close proximity to that surface that these solids strike the collecting ring in a substantially tangential direction. As solids discharged at various successive points around that ring are deflected by the ring, they accumulate and move together around the surface of the ring due to their rotational momentum. While other means, such for example as those illustrated in my prior Patent 2,095,206, may be used for collecting solids from a plurality of points surrounding the rotating rotor, the use of a collecting ring closely surrounding the rotor is preferred, as discussed above.

As illustrated in Figure 1 of the drawings, solids passed to the rotor through feed tube 10 may be passed outwardly through pressure leg 11 interconnecting the feed tube with the pervious circumferential wall 12 of the rotor, and these solids may be discharged over the upper annular lip 13 of the rotor while the liquid is discharged through wall 12 to casing 31 and removed through spout 32. The under surface of the confining plate 14 which defines with the upper surface of the base 15 of the rotor the pressure leg portion of the centrifugal, as well as other portions of the interior surface of the centrifugal rotor, may be formed of smooth hard metal, and the solids accumulating along the inner surface of the perforated wall 12 may be passed upwardly along that wall by the pressure of accumulated solids between the portions 14 and 15 of the rotor as further solids are fed to the rotor through the feed tube 10. It is to be understood that this method of feeding, dehydrating and discharging solids fed to the rotor is referred to only for the purpose of illustrating one manner in which the centrifugal dehydration may be accomplished in connection with other features of the invention, and that the invention is by no means limited to this specific principle of operation of the centrifugal. Indeed, any means whatever by which solids are centrifugally treated and discharged under centrifugal force from the centrifugal rotor may be used in the practice of the present invention, regardless of whether the discharge of solids from the rotor is continuous, as illustrated, intermittent or batch.

Solids discharged across the upper edge 13 of the rotor as illustrated in Figure 1 are passed almost tangentially into contact with the surrounding wall 16 of the collecting ring 17. This ring may be provided with an overhanging upper edge 18 and with an inwardly extending lower edge 19 to prevent escape of solids from the collecting ring except in the manner described hereinafter. As pointed out above, the collecting ring should lie closely adjacent to the edge of the rotor 13 across which the solids are discharged, since the solids will thus strike the inner surface 16 of the ring in a direction substantially tangential with respect to that surface, thus minimizing breakage of solids and also minimizing retardation of these solids upon striking the collecting ring. Solids collected from a plurality of points around the surface of the ring 17 are gradually deflected and collected in a stream of solids moving around that ring, as illustrated by arrows in Figure 2. At one or more points around the circumference of the ring 17, this ring is connected with a conduit or conduits 118 arranged substantially tangentially with respect to the ring, in order that collected solids may be discharged in a confined stream through this conduit or conduits under momentum retained by these solids from discharge from the centrifugal rotor. These solids are thus passed by the conduit or conduits 118 to a collecting receptacle 19' in a manner which minimizes breakage by avoiding sudden impact of solids against any solid retarding surface lying at a substantial angle with respect to the direction of movement of the solids at any point of their travel from the centrifugal rotor to the collecting receptacle.

In the preferred embodiments of the invention, the solids are subjected to dehydration by evaporation to remove at least a part of the liquid which they may retain after discharge from the centrifugal rotor, during the passage of such solids to the collecting receptacle. Figure 3 illustrates a method of accomplishing this result in connection with solids discharged from a rotor mounted on a horizontal axis. In this embodiment of the invention, solids discharged from the rotor 20 are collected in ring 21 and passed around that ring in a manner which will be evident from the above discussion of the embodiment of Figures 1 and 2 of the drawings, and from applicant's prior patent Reissue 21,882. As here illustrated, the discharged solids are deflected from the collecting ring 21 into a vertically extending conduit 23, in which these solids pass upwardly. The conduit 23 may be of U-shape, as illustrated, and after completing their vertical ascent, the solids may descend through the portion 24 of this conduit. A drying gas may be injected into a branch conduit 25, as illustrated, and this drying gas may pass in counter-current direction with respect to the solids passing through the conduit 23, as illustrated in the drawings. If such drying gas is used, it will be desirable to provide a trap at the lowermost portion of the downwardly extending member 24 of the conduit. Thus, before being discharged into collecting receptacle 26, these solids pass through the trap 27. In order to form such trap, it is only necessary to extend the lower edge 28 of the conduit 24 in a horizontal direction as illustrated. The line A—B interconnecting the lip 29 across which the solids must pass in entering the extension 28 and the lip 30 forming the terminus of the extension 28 should form an angle with the horizontal which is less than the angle of slip of the solids with respect to each other. By forming a trap of this kind, the solids will build up to some line such as that indicated at C—D in the drawings, with the result that the heated gas used to assist in evaporation of the solids by introduction into the branch conduit 25 may not escape downwardly through the lower end of the branch 24 of the conduit 23 or be diluted by cooler gas entering at 28.

In connection with the embodiment of the invention discussed above, as in connection with other embodiments discussed hereinafter, it will be evident that the solids are permitted to dry by evaporation during their vertical passage. The use of the principle of combining solids discharged from various points around the circumference of the centrifugal rotor in the form of a confined stream renders it feasible to introduce into this stream a gas employed to assist in removal of further liquid by evaporation.

Figures 4 and 5 illustrate the application of the principles of the invention to an operation in which the centrifugal rotor is mounted on a vertical axis. The centrifugal separator and collecting ring here illustrated are, in general, similar to those of my prior patent, Reissue 21,882. The solids, which have been largely deprived of adhering liquid by centrifugation, are discharged across the upper edge 40 of the centrifugal rotor tangentially into collecting ring 41. Solids discharged from a number of consecutive points around the rotor (the entire 360°, as illustrated) are collected in a confined stream in conduit 42, in accordance with the same principle discussed above in connection with Figures 1 to 3. The confined stream of solids passes through conduit 42 under force derived from the momentum of discharge from the rotor, and is discharged upwardly as indicated at 43, into a tower 44. These solids pass upwardly in that tower until the combined retarding effects of air friction and the force of gravity overcome the momentum with which they are initially discharged into the tower 44. The solids then drop through the tower and are finally collected in container 45. In this embodiment of the invention, as in that of Figure 3, a gas may be separately introduced into the tower to effect evaporation of residual moisture from the solids passed into said tower, and this gas may be passed either upwardly or downwardly through the tower. A simple application of heat to the air at the base of a branch conduit 46, as illustrated by the burner 47, will cause a heated stream of air to flow upwardly through the tower against the descending stream of solids.

Figures 6 to 8 illustrate an embodiment of the invention in which the entire centrifugal rotor is mounted in a casing 50. The solids discharged from the rotor 51 are collected in a ring 52 and deflected upwardly by deflectors or conduits 53 spaced around the horizontally extending surface 54 of the collecting ring 52. The solids projected upwardly under momentum which they retain after discharge from the centrifugal rotor are passed through an annular tower defined by the casing 50 and a cylinder 55 lying within the circumference of the casing 50 and spaced therefrom. The solids thus pass upwardly until their momentum of discharge through the conduits 53 is destroyed by the counteracting forces of air friction and gravity, and they thereafter descend through the space between the walls 50 and 55 into container 56, while liquid removed through the wall 51 of the rotor is discharged through casing 57 and spout 58. In this case, as in the embodiment of Figure 5, the fact that the solids pass upwardly until they come to a complete stop before descending through the drying tower provides time for removal of a substantial proportion of the residual moisture from them in the evaporating tower. The velocity of the solids is arrested by air friction and the force of gravity, thereby avoiding fracture thereof such as might occur by impact against a solid surface. In the embodiment of Figures 6 to 8 as in the embodiment of Figure 5, a drying gas may be separately introduced into the tower into which the solids are projected upwardly, if the use of a drying gas for this function is deemed to be desirable.

Various modifications are possible within the scope of the invention, and I do not therefore wish to be limited except by the scope of the following claims.

I claim:

1. In the separation of liquid from solids, the process comprising subjecting a mixture of liquid and solids to centrifugation in a centrifugal rotor, discharging the solids from the edge of said rotor under the influence of centrifugal force, collecting said solids and guiding them to form a confined stream, delivering said confined stream into a conduit for directing flow of said solids upwardly under force derived from the momentum of discharge from said rotor, and, during their movement upwardly through said conduit, passing said solids through an atmosphere capable of effecting removal of residual liquid therefrom.

2. A process as defined in claim 1 in which the atmosphere is caused to move in a direction similar to that in which the solids are moving.

3. A process as defined in claim 1 in which the atmosphere is caused to move in a direction counter to that in which the solids are moving.

4. A process as defined in claim 1 in which the atmosphere is heated.

5. In an apparatus for separating liquid from solids, the combination comprising means for feeding a mixture of liquid and solids to a centrifugal rotor having a perforated wall and a circumferential edge, means for rotating said rotor to remove liquid from said solids while said solids pass along said wall to discharge over said edge, a collecting ring annularly positioned relative to said rotor, for receiving solids discharged from said edge, and having a circumferential surface sufficiently close to said edge to assemble solids discharged over said edge and against said collecting ring into a confined stream moving under the force of their rotational momentum, and means operatively connected to said collecting ring for discharging and directing said confined stream upwardly while said solids still have substantial momentum remaining.

LAURENCE P. SHARPLES.